United States Patent [19]

Bertschinger et al.

[11] 4,392,954
[45] Jul. 12, 1983

[54] SEWAGE VENTILATING BASIN

[75] Inventors: Hans Bertschinger, Dübendorf; Alfred Scherler, Reidholz, both of Switzerland

[73] Assignees: Locher & Cie. AG, Zurich; Cellulose Attisholz AG., Luterach, both of Switzerland

[21] Appl. No.: 11,890

[22] Filed: Feb. 13, 1979

[30] Foreign Application Priority Data

Feb. 16, 1978 [CH] Switzerland .......................... 1717/78

[51] Int. Cl.³ ............................................. C02F 3/22
[52] U.S. Cl. ................... 210/195.3; 210/219; 210/220
[58] Field of Search ............... 210/150, 198 R, 221 P, 210/60, 220, 22 R, 219, 195.3, 208, 14, 623

[56] References Cited

U.S. PATENT DOCUMENTS

| | | | |
|---|---|---|---|
| 1,900,809 | 3/1933 | Hammerly | 210/219 |
| 2,060,166 | 11/1936 | Bowen | 210/198 R |
| 2,348,122 | 5/1944 | Green | 210/198 R |
| 3,650,950 | 3/1972 | White | 210/60 |
| 3,879,296 | 4/1975 | Schneider | 210/519 |
| 3,979,294 | 9/1976 | Kaelin | 210/219 |
| 3,997,437 | 12/1976 | Prince et al. | 210/623 |

Primary Examiner—Ernest G. Therkorn
Attorney, Agent, or Firm—Browdy & Neimark

[57] ABSTRACT

A sewage ventilating basin of a sewage treatment plant comprises a sewage container which is sunk into the ground and into which project three vertical tubes which connect the surface water of the container with the deepest water thereof. By means of feed pumps, a downwardly-directed flow is produced in the tubes so that the sewage in the container circulates upwardly and recirculates in the tubes. Disposed in each tube in the upper part thereof are devices for the fine-bubble introduction of a ventilating gas. The flow velocity of the sewage in the tube and directly below this upper part is higher than the uplift velocity of the gas bubbles being introduced into the flow at the same point. Since the gas is introduced into the sewage not in the bottom zone of the container but instead in the upper part of the tube, the gas pressure is lower than in the case of the direct introduction of the gas into the bottom zone, and also the energy expenditure is smaller with a high effectiveness of the ventilation.

7 Claims, 5 Drawing Figures

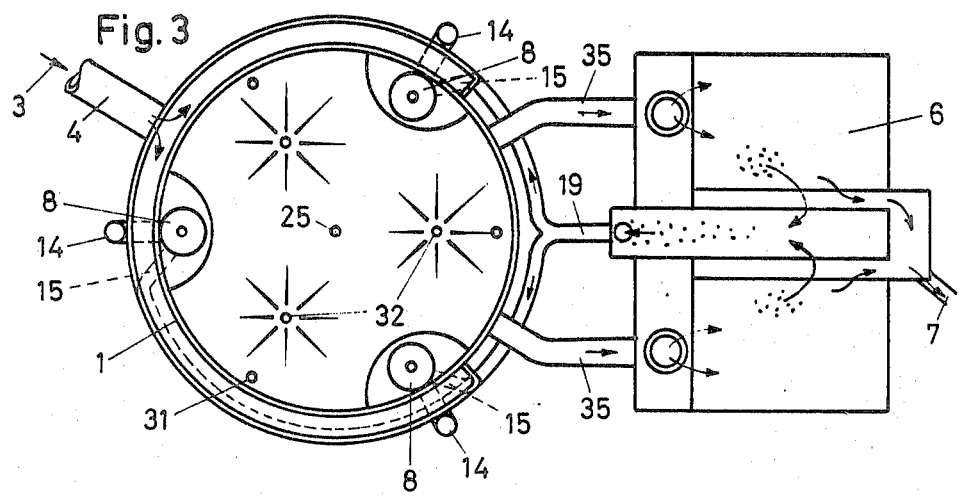
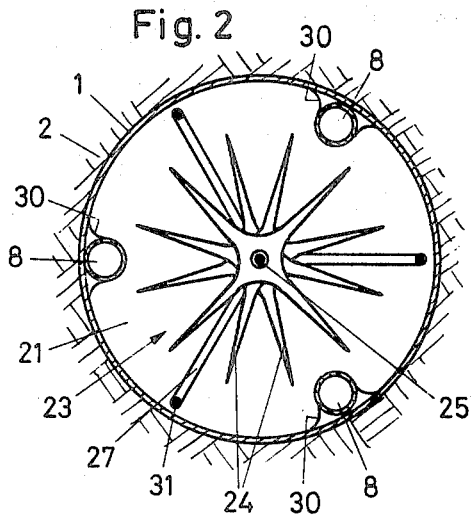
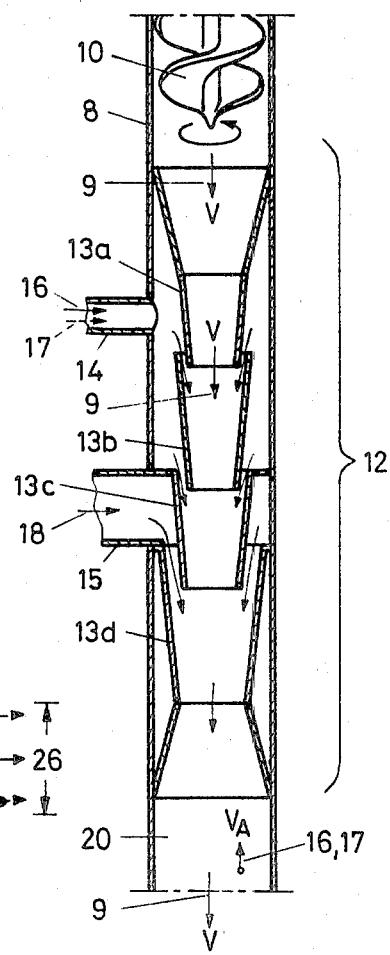
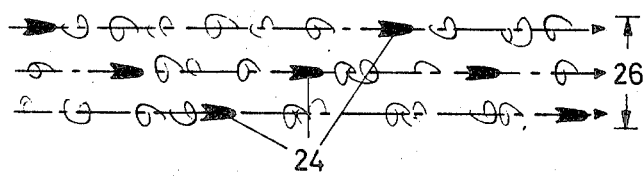

SEWAGE VENTILATING BASIN

FIELD OF THE INVENTION

The present invention relates to a sewage ventilating basin for use in a sewage treatment plant including a tube passing from the top to the bottom of the basin and a pump for causing water circulation in the basin, through the tube. Known plants of this kind have been described, for example, in the Lehr- und Handbuch der Abwassertechnik [Text- and Handbook of Waste Water Techniques], volumes I–III, 1975 (Abwassertechnische Vereinigung e.V. in Bonn; Verlag Wilhelm Ernst und Sohn, Berlin—Muenchen— Duesseldorf) [Waste Water-Technical Association, a registered association, in Bonn; Wilhelm Ernst and Son, Publishers, Berlin—Munich—Duesseldorf].

BACKGROUND OF THE INVENTION

Oxygen is needed for the biological decomposition of organic pollutants contained in waste waters. In customary basins of the biological activated-sludge sewage treatment plants, the introduction of oxygen into the waste water is effected either by blowing compressed air into a depth of a few meters below water level, or by a surface ventilation. In isolated cases, pure oxygen is used instead of air. The waste water absorbs the oxygen in the dissolved form. In connection with the introduction of air and/or oxygen below the water surface, the blow-in depth and the size of the gas bubbles are of significance for the effectiveness of the plant. A higher pressure combined with a greater blow-in depth enhances the gas charge; likewise, many small bubbles are more advantageous, as compared to a few large bubbles, because of the greater total contact surface of gas/water. In addition, the contact time plays a role, and specifically the gas bubbles having been introduced into a greater depth have available—as a result of the longer ascending path to the water surface—a correspondingly longer contact time. On the other hand, it must be taken into account, of course, that the size of the gas bubbles, and therewith the contact time, is dependent upon the respective water depth and the pressure prevailing there.

The energy consumption needed for the gas charge in the known waste water ventilating basins is on the order of 0.7–1.5 kWh per kilogram of oxygen being introduced and constitutes a significant portion of the operational costs of a sewage treatment plant.

In conceptualizing a sewage ventilating basin, the following physical conditions must be taken into consideration for an optimal oxygen introduction or charge:

—the presence in minute bubbles of the gas to be added
—a high pressure during the contact time
—a long contact time
—the uniform reach or inclusion of the entire quantity of sewage.

A good, minute-bubble gas introduction method consists in pressing the gas being supplied by a blower or compressor through a finely porous body, which may have any desired shape, under water into the basin. The porous body may consist, for example, of a ceramic, or a corrosion-resistant material. The uplift or upward pressure velocity of the gas bubbles issuing from the porous surface into the water depends upon the size of the bubbles and the viscosity of the sewage. Thus, for example, smaller gas bubbles are frequently passed by larger ones so that, during their rising in stagnant water, larger and fewer bubbles appear at the surface than are produced below, which is disadvantageous because of the upwardly decreasing total contact surface of gas/water.

This natural phenomenon may be countered, for example, in that the large bubbles are dispersed over and over again by means of producing a high turbulence in the water.

A turbulence may be brought about by deflecting the path of the bubbles with static means, for example by installing tilted baffle plates at whose edges turbulent zones are generated. More effective, however, would be mechanical devices, such as, for example, oppositely-directed paddles or propellers which, in addition to generating turbulence, will also directly break up large bubbles.

The pressure at which the oxygen introduction or charge is to take place is determined, in an open basin, by the water depth wherein, as is well known, the pressure increases linearly with the depth. The pressure in the gas bubbles corresponds precisely to the pressure of the ambient water in the respective depth. In an ascending gas bubble, therefore, the pressure decreases and the volume increases at the same time; in other words, rising bubbles expand and the contact surface of the individual bubble also increases.

Basically, two different possibilities exist for obtaining a high pressure in sewage, namely on the one hand the generation of high pressure within closed containers by means of either hydraulic or pneumatic systems, and on the other hand the utilization of great water depths in ventilating towers or ventilating shafts.

While in sewage towers the raw sewage as well as the residual sludge must be pumped up to the pressure head of the tower, this expenditure may be obviated in cases where a subterranean shaft can be sunk. Here the sewage inflow, the residual sludge feed, and the water drainage will hardly occasion any energy costs other than those which arise in the customary flat basin plants. Yet the energy expenditure involved in the introduction of oxygen into the water is relatively great.

In a sewage tower and in a deep sewage shaft, the water circulation plays an important part. The cross-sectional dimensions are relatively small as compared to the water depth, and the water does not circulate independently since no high temperatures or differences in density occur. In actual operation it is therefore not sufficient simply to replace any oxygen-enriched water discharging from the top with inflowing water being introduced from above because such inflowing water could practically not flow into the lower zones where the rational oxygen charge or introduction can take place.

For this reason the water circulation must be artificially produced and/or enhanced. When the oxygen is introduced at the tower or shaft bottom, the untreated sewage must be brought to this bottom area, and precisely together with the residual sludge from the subsequent purification. The shaft content must be adjusted or coordinated to the quantity of sewage to provide a residence time of the sewage within the container which is appropriate with respect to the container, corresponding to the decomposition output.

In sewage shafts, the sewage feed line and the air or oxygen line are expediently installed in the interior of the shaft. Instead of causing the water to flow just once upwardly from below and then have it flow into the subsequent purification basin, it may also be advisable to circulate the water being present in the shaft repeatedly in the vertical direction. This may be accomplished, for example, in that the tower or shaft is subdivided into two or more like or unlike shafts by means of vertical walls or pipes, and the circulation is effected with feed pumps. For the purpose of a good intermixture, the raw sewage is advantageously added to the revolution in a downwardly-directed stream. In order to achieve as long as possible a contact time of the gas bubbles in the water, the air is brought to a high pressure by means of a compressor and thereafter introduced into the sewage as much as possible in proximity to the bottom of the shaft and as much as possible in minute bubbles.

This requires a high energy expenditure for the compressor so that the operational costs of known sewage treatment plants with sewage ventilating basins are relatively high.

SUMMARY OF THE INVENTION

It is now the object of the present invention to eliminate this disadvantage. It is intended to create a sewage ventilating basin of the type mentioned hereinbefore wherein the energy expenditure for the introduction of oxygen is reduced while the effectiveness of this introduction is simultaneously improved.

In accordance with the present invention, this object is obtained by virtue of the fact that devices for the fine-bubble introduction of a gas are disposed in an upper part of the pipe, and that the flow velocity of the sewage in the pipe directly below this upper part is greater than the uplift velocity of the gas bubbles being suspended in the flow at the same place.

Achieved with this provision of the sewage ventilating basin is a very fine-bubble oxygen introduction into the sewage, i.e. the total gas bubble surface is large, which results in a correspondingly high diffusion velocity of the oxygen in the water. The uplift velocity of the small gas bubbles is very low so that a long contact time is obtained. Due to the high turbulence and microturbulence of the water, the oxygen-saturated boundary layers of the small gas bubbles are rapidly renewed, and the rate of solution and diffusion velocity is influenced advantageously. The good intermixture and revolution of the sewage leads to a homogeneous distribution of the pollutants, of the oxygen, and of the sludge, and contributes to the realization of a balanced decomposition of the organic pollutants. Since the air and/or oxygen is not introduced in the bottom zone but in an upper zone into the downwardly-directed pipe, the gas pressure is lower than in the case of the direct introduction of the gas into the bottom zone, as in the prior art sewage treatment plants, so that the energy expenditure is considerably smaller.

Lastly, it should be pointed out that the afore-mentioned measures not only will not impair the microorganisms which decompose the pollutants, but the so-called substrate breathing as well as the endogenous breathing will be accelerated and intensified. As a result thereof, shorter residence times of the sewage within the activator container and/or smaller containers are required.

Experiments have shown that with the inventive sewage ventilating basin it is possible to introduce into the waste water per kWh a multiple of oxygen as compared to known sewage treatment plants.

BRIEF DESCRIPTION OF THE DRAWINGS

One embodiment of the present invention will hereinafter be described in further detail on the basis of the accompanying drawings, wherein

FIG. 2 is a horizontal cross section taken along line II—II through the shaft according to FIG. 1;

FIG. 3 is a horizontal cross section taken along line III—III through the shaft according to FIG. 1;

FIG. 4 illustrates a detail of the pump and injector part according to the segment IV according to FIG. 1 at an enlarged scale; and FIG. 5 illustrates schematically the horizontal performance of the turbulence-producing elements.

DETAILED DESCRIPTION OF A PREFERRED EMBODIMENT

Figure 1:
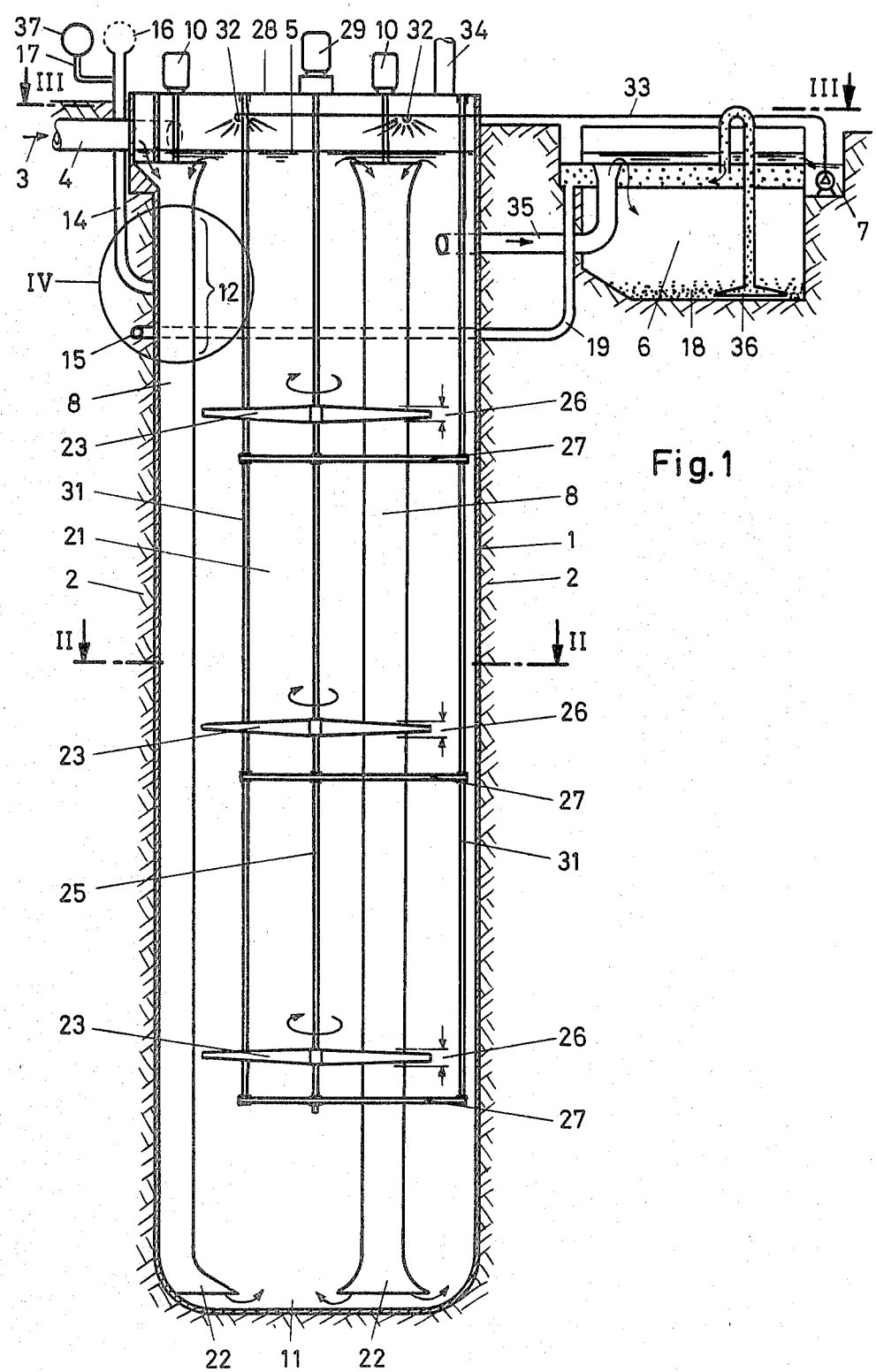
FIG. 1 is a vertical cross section through a sewage ventilating shaft sunk into the ground.

The sewage ventilating shaft illustrated in FIG. 1 belongs to the category of the open types of construction in which the water surface is subjected to atmospheric pressure. Also possible are types of construction in the form of towers above the ground, as well as shafts disposed subterraneously or in intermediate layers, which are suitable for relatively large quantities of water with varying pollutant concentrations. The water depths are between 10 and 50 meters, but deeper shafts are equally possible. The diameters amount to approximately 1.5 to 3 meters, with greater diameters also being possible, however.

The main constituent of the plant according to FIG. 1 is the sewage container 1 which is sunk into the ground 2 and containing sewage 21 being treated. The inflow of the raw sewage 3 takes place by way of the channel 4 which terminates into the container 1 above the water surface 5. Disposed next to the container 1 and equally sunk into the ground 2 is a subsequent purification basin 6 whose overflow is in operative connection with the discharge channel 7. Three vertical tubes 8 projecting into the container 1 and in which a downwardly-directed waste water or sewage flow 9 is produced by means of water feed pumps 10, connect the upper part of the container 1 with its bottom zone 11 and carry surface waste water to the bottom.

The water feed pumps 10 may be electrically-driven pre-rotation pumps known per se. Disposed in the upper region 12 of the tube 8 is a plurality of successively-arranged narrowing or constricting tube lengths 13a–13d in the form of Venturi tubes. Within these lengths 13, the flow velocity V is accelerated due to the injector effect, which results in a lower static pressure. An air supply line 14 terminates in the tube 8 within the area of the first tube-narrowing length 13a so that the air 16 is suctioned in and intensively mixed with the waste water jet directly below the first tube 13a. In one of the subsequent tube-narrowing or constricting lengths or paths 13c, the inlet connecting piece 15 terminates in the tube 8 which supplies the residual sludge 18 by way of the line 19. The residual sludge 18 is equally suctioned in due to the flow 9 and intensively mixed with the sewage flowing downwardly. Instead of air 16, pure oxygen 17, or air enriched with oxygen could also be introduced into the flow in the same manner.

Through the tube 8 being thereafter widened again flows therewith a mixture of raw sewage 3, circulating sewage water 21 recycled sludge 18, and air 16 and/or oxygen 17. The stationary uplift velocity $V_A$ of the gas bubbles is highest directly below the narrowing lengths or paths 13 because at this point 20 a lower pressure still prevails than at a lower-positioned point near the container bottom, and the volume of the gas bubbles is still greatest here. In order that the gas bubbles 16, 17 being suspended in the flow 9 be concomitantly transported downwardly, the flow velocity V of the water at the point 20 must be slightly higher than the stationary uplift velocity $V_A$ of the gas bubbles. During the transportation downwardly, the gas bubbles enter zones with a linearly increasing pressure and therewith become smaller so that their uplift velocity decreases. It is true, however, that due to the lower gas volume portion of the mixture, the density thereof will slightly rise, additionally supported by the fact that because of the diffusion of oxygen in the water an additional gas volume shrinkage will occur. With a constant cross section of the tube 8, there arises therefore a slight velocity decrease which, in turn, will lead again to a pressure increase and density increase of the mixture. In the concrete case, however, these changes are relatively small.

Still, with long tubes and a sufficiently long contact time, an almost complete oxygen passage into the water may be achieved already within the tube 8. Essential for the contact time is the velocity difference $\Delta V = V - V_A$ of the downwardly-directed flow and/or of the upwardly-directed uplift, whereby of course this difference must be positive so that all of the suctioned-in gas bubbles are conveyed downwardly. When this difference is great, the gas bubbles reach the lower tube end quickly, but if it is small, the long contact time being sought is achieved.

After reaching the tube mouth 22 within the container bottom zone 11, the mixture in the sewage container 1 flows upwardly. The gas bubbles will then flow toward the water surface 5 and will thereby enter zones having a decreasing pressure; i.e. the reverse procedures with respect to bubble size and mixture density will take place as compared to those in the downwardly-directed flow within the tube 8. Since the size of the gas bubbles is variable, the larger will move upwardly faster than the smaller so that they will be combined with each other and so that individual larger bubbles are formed.

For the purpose of maintaining the fine-bubble condition of the gas on its relatively long path within the container, it may be advantageous to provide intensive turbulence zones 26 at either one or several points. Used for producing the turbulence are mechanical means which cover the entire shaft cross section but generate a very small intensity of turbulence density and thus require little energy. Achieved by virtue of these turbulence zones 26 is the fact that larger bubble formations at various points are broken up in order to maintain the fine-bubble condition of the gas over the entire water depth.

As turbulence generators serve, for example, the propeller devices 23 shown in FIGS. 1 and 2. Each device 23 is provided with a packet or set of twelve propeller blades 24 which are secured to the drive shaft 25. The set of blades has a small thickness in order that the layer thickness of the horizontal turbulence zone 26 remain as small as possible. The thin drive shaft 25 is positioned within three mounting supports 27 and is driven by means of the geared engine 29 mounted on the container cover 28. Because of the higher velocity of the blades toward their outer ends, they may become thinner outwardly from the shaft 25 in order that the layer thickness of the turbulence zone 26 remain approximately the same over the entire diameter. The actually undesirable rotation of the entire container or vessel content is countered by the three tubes 8 acting as baffle plates. In order to avoid sludge deposits, cover plates 30 are disposed between the tubes and the inner container wall so as to cover the lost corner spaces.

In order to render it possible to remove from the container the propeller devices 23 together with the drive shaft 25 for purposes of inspection, three guide rods 31 are fastened to the inner container wall. The outer ends of the mounting supports 27 are slidingly positioned on these guide rods so that the drive shaft 25 together with the propeller devices 23 may be removed from the container 1 in a simple manner.

Water nozzles 32 may be fastened to the container cover 28 in a manner known per se for possibly combating foam above the water level 5 of the container. The spray water is removed from the drainage channel 7 by way of the line 33. Further disposed at the top of the container cover 28 is a waste gas connecting piece 34 designed for removing the used air.

A part of the ventilated sewage 21 circulating downwardly through the tubes 8 and upwardly within the container 1 is continuously removed from the container 1 and flows into the subsequent purification basin 6 by way of the pipe lines 35. A part of the sludge 18 being deposited in the subsequent purification basin 6 is supplied again to the sewage circulation or cycle via the siphon 36 and the residual sludge line 19. The oxygen tank 37 serves for the supply of the plant with pure oxygen 17 which may be employed either alternately or together with air 16.

The dimensioning or design of the entire plant should be made individually for each respective case because, in addition to the quantity and composition of the waste water to be treated other conditions, for example the building site may play an important role for the container. The container size, the residence time of the water within the container, the pump output, the circulation velocity, the tube diameter, etc. must be coordinated with respect to each other in the dimensioning or design so as to provide an optimal ventilation process. The influences of the various physical and biological parameters are determined on the basis of experimental results. The intensive ventilation carried out in the described plant leads to a significant heat production within the container which is relatively well insulated in the ground. It would therefore be possible to utilize the increased water temperature, for example by means of a heat pump.

We claim:

1. A sewage ventilating basin for use in a sewage treatment plant, comprising:
   a vertically elongated sewage container;
   at least one substantially cylindrical tube connecting the upper, or surface-water, zone of said elongated container with the bottom, or deepest-water, zone of said container;
   pump means for producing a downwardly directed flow in each said tube in order to maintain sewage circulation in the container when in use;
   means for recycling residual sludge to said sewage ventilating basin;
   gas introduction means, disposed in an upper part of each said tube, for introducing fine bubbles of a gas thereinto; and control means for maintaining the flow velocity of the sewage, in each said tube directly below said upper part thereof, higher than the uplift velocity of the gas bubbles suspended in the flow at the same point, when in use.

2. A sewage ventilating basin in accordance with claim 1, wherein said tube contains, in said upper part, at least one downwardly directed tapered wall portion in the form of a Venturi tube, and wherein said gas introduction means includes an air and/or oxygen inlet connecting piece terminating in said upper part of said tube, whereby, due to the suction effect caused by the injection principle, the air and/or oxygen is introduced into the flow within said tube.

3. A sewage ventilating basin in accordance with claim 1 including a plurality of said tubes, each with a corresponding one of said pump means.

4. A sewage ventilating basin in accordance with claim 1 wherein said air introduction means comprises means to introduce air and/or oxygen at a gas pressure greater than that pressure in the bottom zone of said container.

5. A sewage ventilating basin in accordance with claim 1 further including at least one turbulence generator means within said container for generating turbulence therein, each said turbulence generator means comprising a set of propeller blades driven by a joint drive shaft, the thickness of said set of blades being considerably smaller than the diameter thereof.

6. A sewage ventilating basin in accordance with claim 5 wherein said turbulence generator means further comprises a plurality of guide rods secured to the inner wall of said container and a plurality of mounting supports slidingly disposed on said guide rods, said drive shaft passing through and being positioned by said mounting supports.

7. A sewage ventilating basin for use in a sewage treatment plant, comprising:
a vertically elongated sewage container;
at least one substantially cylindrical tube connecting the upper, or surface-water, zone of said elongated container with the bottom, or deepest-water, zone of said container;
pump means for producing a downwardly directed flow in each said tube in order to maintain sewage circulation in the container when in use;
gas introduction means, disposed in an upper part of each said tube, for introducing fine bubbles of air or oxygen thereinto, said gas introduction means comprising at least one downwardly directed tapered wall portion in a the form of a venturi tube, and an air and/or oxygen inlet connecting piece terminating in said upper part of said tube whereby, due to the suction effect caused by the injection principle, the air and/or oxygen is introduced into the flow within said tube adjacent said venturi;
residual sludge recycling means for recycling residual sludge to said sewage ventilating basin, said residual sludge recycling means comprising a second venturi-shaped tapered wall portion in said upper part of said elongated tube, and residual sludge introduction means including a residual sludge line terminating in said upper part of said tube adjacent said second venturi-shaped tapered wall portion whereby residual sludge is caused to be sucked into the flow within said tube; and
control means for maintaining the flow velocity of the sewage, in each said tube directly below said upper part thereof, higher than the uplift velocity of the gas bubbles suspended in the flow at the same point, when in use.

* * * * *